(12) United States Patent
Shirato et al.

(10) Patent No.: US 7,195,577 B2
(45) Date of Patent: Mar. 27, 2007

(54) DIFFERENTIAL OF FOUR-WHEEL DRIVE VEHICLE

(75) Inventors: Kouichirou Shirato, Atsugi (JP); Takanori Hagihara, Shizuoka (JP)

(73) Assignee: Jatco Ltd, Fuji (JP)

( * ) Notice: Subject to any disclaimer, the term of this patent is extended or adjusted under 35 U.S.C. 154(b) by 214 days.

(21) Appl. No.: 11/085,002

(22) Filed: Mar. 21, 2005

(65) Prior Publication Data

US 2005/0221944 A1    Oct. 6, 2005

(30) Foreign Application Priority Data

Mar. 30, 2004    (JP)    ............................. 2004-101055

(51) Int. Cl.
*F16H 48/06*    (2006.01)
(52) U.S. Cl. .................................... 475/230
(58) Field of Classification Search ............... 475/230, 475/231
See application file for complete search history.

(56) References Cited

U.S. PATENT DOCUMENTS 5,509,862 A * 4/1996 Sherman .................... 475/230
5,806,371 A * 9/1998 Hibbler et al. ............... 74/409
6,093,127 A * 7/2000 DiDomenico et al. ...... 475/230
2005/0221942 A1   10/2005 Shirato et al.

FOREIGN PATENT DOCUMENTS

JP    9-150641 A    6/1997

* cited by examiner

*Primary Examiner*—Ha Ho
(74) *Attorney, Agent, or Firm*—Foley & Lardner LLP

(57) ABSTRACT

A differential case (2) comprises a hollow shaft (2b) for transmitting the rotation of an output gear of a transmission to a transfer and houses a pair of pinions (4) and a pair of side gears (7R, 7L) which mesh with the pinions (4). The side gears (7R, 7L) comprising sleeves (8) which engage with front wheel axle shafts (101R, 101L). Plugs (12) which seal the sleeves (8) of the side gears (7R, 7L), a first oil seal (13) disposed between the hollow shaft (2b) and the sleeve (8) of one of the side gears (7R), a second oil seal (14) disposed between the hollow shaft (2b) and the differential housing (10), and a third oil seal (15) disposed between the differential housing (10) and the sleeve (8) of the other side gear (7L), stop oil filled in the differential casing (10) and differential housing (2) from flowing out.

3 Claims, 1 Drawing Sheet

DIFFERENTIAL OF FOUR-WHEEL DRIVE VEHICLE

FIELD OF THE INVENTION

This invention relates to a differential of a four-wheel drive vehicle.

BACKGROUND OF THE INVENTION

Tokkai Hei 09-150641 published by the Japan Patent Office in 1997 discloses a differential for a four-wheel drive vehicle based on a front-wheel drive vehicle.

This differential is formed in a differential housing fixed to a transmission case. A differential case is supported free to rotate in the differential housing via a bearing. A ring gear which meshes with the output gear of the transmission, and a hollow shaft to spline-joint the output shaft, are coaxially fixed to the differential case.

In the differential case, a pair of pinions are supported free to rotate via a pinion shaft. A pair of side gears that mesh with these pinions are housed in the differential case. Each side gear has a sleeve which is spline-jointed to an axle shaft of the front wheels. The rotation of a ring gear is transmitted to a transfer via an output shaft, and transmitted from the transfer to the rear wheels.

The rotation of the ring gear is also distributed to the side gears via the pinions in the differential case, and transmitted to the front wheels via the axle shafts.

SUMMARY OF THE INVENTION

This differential is shipped as a transmission/differential assembly joined to a transmission.

When the vehicle is assembled, the output shaft is assembled with a hollow shaft, the axle shafts are assembled with the side gear sleeves, and the differential housing is then filled with an automatic transmission fluid (ATF).

Injecting the ATF into the differential housing after the axle shaft and output shaft have been assembled, means that the ATF is injected as part of the vehicle assembly process. This complicates the vehicle assembly process, and also, a special working space is needed to inject the ATF.

It is therefore an object of this invention to enable shipment of a transmission/differential assembly when it has been filled with the ATF.

In order to achieve the above object, this invention provides a differential used in conjunction with a four-wheel-drive vehicle transmission for transmitting a rotation of an output gear of the transmission to a pair of front wheel axle shafts and a transfer which drives the rear wheels. The differential comprises a ring gear meshed with the output gear, a differential case which rotates together with the ring gear and comprises a hollow shaft which transmits the rotation to the transfer, a pinion shaft fixed to the differential case, a pinion supported free to rotate around the pinion shaft in the differential case, a pair of side gears housed in the differential case which mesh with the pinion.

The side gears comprise sleeves which engage with the axle shafts, wherein one of the side gear sleeves extends inside the hollow shaft.

The differential further comprises a differential housing fixed to the transmission housing, which houses the differential case and ring gear. The differential case and differential housing are filled with oil.

In order to prevent oil from leaking, the differential is provided with plugs which seal the side gear sleeves, a first oil seal disposed between the hollow shaft and the gear sleeve extending inside the hollow shaft, a second oil seal disposed between the hollow shaft and the differential housing, and a third oil seal disposed between the differential housing and the other side gear sleeve.

The details as well as other features and advantages of this invention are set forth in the remainder of the specification and are shown in the accompanying drawings.

DESCRIPTION OF THE PREFERRED EMBODIMENTS

Figure 1:
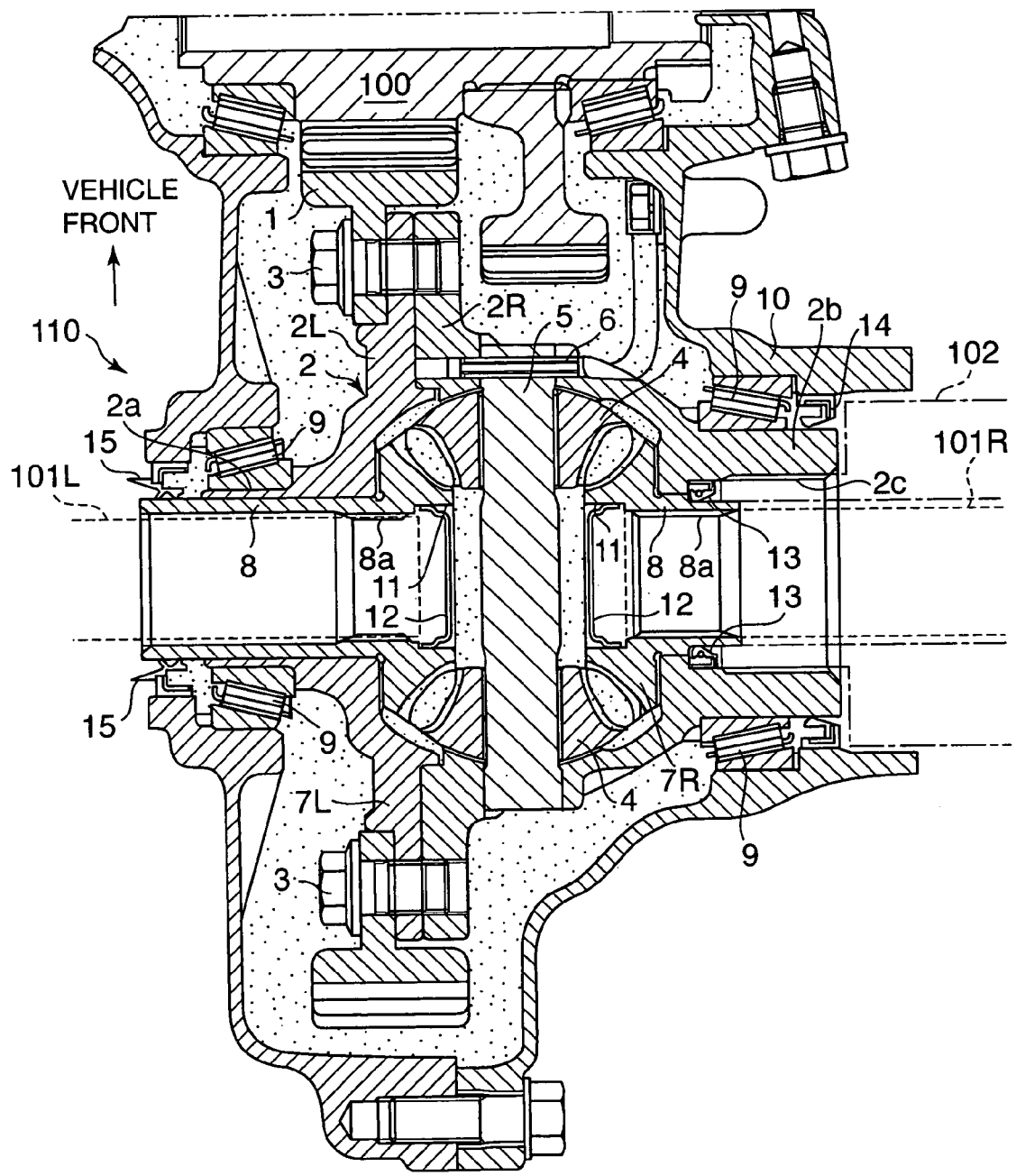
FIG. 1 is a cross-sectional view of a differential according to this invention.

Referring to FIG. 1 of the drawings, a differential 110 for a four-wheel drive vehicle based on a front-wheel drive vehicle according to this invention comprises a ring gear 1 which meshes with an output gear 100 of the transmission. The upper part of the FIGURE corresponds to the vehicle running direction.

The ring gear 1 is fixed to a spherical differential case 2. The differential case 2 comprises left and right differential case parts 2R, 2L that are joined by a bolt 3. The ring gear 1 is formed in one piece with the differential case parts 2R, 2L by this bolt 3.

The differential case parts 2R comprise a hollow shaft 2a. The differential case parts 2L comprise a hollow shaft 2b. The hollow shafts 2a, 2b are situated coaxially, and the bearing 9 is press-fit into the outer circumferences of each of the hollow shafts 2a, 2b. The differential case 2 is fitted to differential housing 10 with these bearings 9 press-fit into the hollow shafts 2a, 2b, such that the whole differential case 2 is supported free to rotate in the differential housing 10 via the bearings 9. The differential housing 10 is fixed to a transmission housing.

Side gears 7R, 7L and a pair of pinions 4 that mesh with the pair of side gears 7R, 7L, are housed in the differential case 2. The pair of pinions 4 are supported free to rotate on a common pinion shaft 5. The pinion shaft 5 penetrates the center of the differential case 2 perpendicularly to the shafts 2a, 2b, and is fixed to the differential case part 2R by a pin 6.

The side gear 7R has a sleeve 8 that extends inside the hollow part of the hollow shaft 2b. The side gear 7L has a sleeve 8 that extends outside from the hollow part of the hollow shaft 2a. Splines 8a are formed in the inner circumferences of these sleeves 8. When the vehicle is assembled, axle shafts 101R, 101L of the left and right front wheels shown by the broken line in the FIGURE, are respectively inserted in the sleeves 8 of the side gears 7R, 7L, and joined to the side gears 7R, 7L via the splines 8a.

Splines 2c are formed in the inner circumferences of the hollow shaft 2b of the differential case part 2R to spline-joint an output shaft 102 shown by the dot and dash line in the FIGURE. The output shaft 102 is formed hollow so that the axle shaft 101R penetrates inside. For this reason, the inner diameter of the splines 2c is set sufficiently larger than the outer diameters of the sleeve 8 of the side gear 7R. The output shaft 102 joined to the hollow shaft 2b via the splines 2c, transmits the rotation of the differential case 2 to the transfer without change.

The axle shafts 101R, 101L in the FIGURE and the output shaft 102 are not assembled when the differential 110 is shipped, but are assembled in the vehicle assembly stage.

The transmission and differential housing 10 are pre-filled with ATF. This invention provides the assembly with plugs 12 and oil seals 13–15 so that ATF does not flow out from the differential housing 10.

The plugs 12 are provided to stop ATF in the differential case 2 from leaking into the sleeve 8. For this purpose, large diameter parts 11 that are larger than the diameter of the spline 8a, are respectively formed via steps further back than the spline 8a in the sleeves 8 of the side gears 7R, 7L. The plugs 12 are respectively press-fit into the large diameter parts 11. The position of the large diameter parts 11 is set beforehand so that the plugs 12 do not interfere with the assembly of the axle shafts 101R, 101L with the side gears 7R, 7L via the splines 8a.

The oil seal 13 is press-fit between the inner circumference of the shaft 2b of the differential case part 2R, and the outer circumference of the sleeve 8 of the side gear 7R. The oil seal 13 stops ATF in the differential case 2 from flowing out from the space between the shaft 2b and sleeve 8. The position where the oil seal 13 is press-fit is set not to interfere with the assembly of the output shaft 102 in the shaft 2b.

The oil seal 14 is disposed between the outer circumference of the shaft 2b of the differential case part 2R and the differential housing 10. The oil seal 14 stops ATF filled in the working space of the ring gear 1 between the differential case 2 and differential housing 10, from flowing out of the differential housing 10.

The oil seal 15 is disposed between the sleeve 8 of the side gear 2L and the differential housing 10. The oil seal 15 stops ATF in the differential housing 10 and differential case 2, from flowing out of the space between the sleeve 8 and differential housing 10.

The oil seal 13 corresponds to the first oil seal of the claims. The oil seal 14 corresponds to the second oil seal of the claims. The oil seal 15 corresponds to the third oil seal of the claims.

Hence, as the plugs 12 and oil seals 13–15 stop outflow of ATF from the differential housing 10, the transmission/differential assembly can be shipped while filled with ATF and sealed.

The axle shafts 101R, 101L and the output shaft 102 can be assembled in the transmission/differential assembly without damaging the seal of the differential housing 10 by the plugs 12 and oil seals 13–15.

Therefore, this invention makes it unnecessary to fill the differential housing 10 with ATF after assembly of the axle shafts 101R, 101L and output shaft 102, and assembly of a four-wheel drive vehicle based on a front-wheel drive vehicle is particularly simplified.

The contents of Tokugan 2004-101055 with a filing date of May 30, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

The embodiments of this invention in which an exclusive property or privilege is claimed are defined as follows:

What is claimed is:

1. A differential used in conjunction with a four-wheel-drive vehicle transmission for transmitting a rotation of an output gear of the transmission to a pair of front wheel axle shafts and a transfer which drives the rear wheels, comprising:
a ring gear meshed with the output gear;
a differential case which rotates together with the ring gear and comprises a hollow shaft which transmits the rotation to the transfer;
a pinion shaft fixed to the differential case; a pinion supported free to rotate around the pinion shaft in the differential case;
a pair of side gears housed in the differential case which mesh with the pinion, the side gears comprising sleeves which engage with the axle shafts, wherein one of the side gear sleeves extends inside the hollow shaft; a differential housing fixed to the transmission housing, which houses the differential case and ring gear, the differential case and differential housing being filled with oil; plugs which seal the side gear sleeves; a first oil seal disposed between the hollow shaft and the gear sleeve extending inside the hollow shaft; a second oil seal disposed between the hollow shaft and the differential housing; and a third oil seal disposed between the differential housing and the other side gear sleeve.

2. The differential as defined in claim 1, wherein each of the side gear sleeves comprises an inner circumferential surface having a spline for joining the axle shaft to the side gear sleeve and a wide diameter part formed further inside the sleeve with respect to the inner circumferential surface, the wide diameter part having a greater diameter than a diameter of the inner circumferential surface, and each of the plugs is press-fit into the wide diameter part of each of the side gear sleeves.

3. The differential as defined in claim 1, wherein the hollow shaft comprises an inner circumferential surface having a spline, the rotation of the hollow shaft is transmitted to the transfer via an output shaft which is joined to the hollow shaft via the spline, an axle shaft joined to one of the side gears penetrates the output shaft, and the first oil seal is disposed further inside the hollow shaft with respect to the spline.

* * * * *